United States Patent Office 2,797,142
Patented June 25, 1957

2,797,142

METHOD OF REDUCING HEAVY METAL TETRAHALIDES

Joseph J. Katz, Chicago, Ill., assignor to the United States of America as represented by the United States Atomic Energy Commission No Drawing. Application June 29, 1950, Serial No. 171,256

10 Claims. (Cl. 23—14.5)

This invention relates to the reduction of heavy metal tetrahalides and in particular to the reduction of uranium tetrahalides.

It is an object of this invention to provide a process for reducing uranium tetrahalides at normal temperature and below.

It is another object of the present invention to provide a process for reducing uranium tetrahalides in nonaqueous media.

Other objects of this invention will be apparent from the description which follows.

I have found that uranium tetrahalides can be reduced by incorporating in an ether solution of the uranium tetrahalide an alkali metal aluminum hydride whereby at least part of the uranium tetrahalide is reduced to uranium trihalide or to a lower valence by the reducing action of alkali metal aluminum hydride. The uranium tetrahalide that can be used in carrying out the present invention is selected from the group consisting of uranium tetrachloride, uranium tetrabromide, and uranium tetraiodide. The reaction will occur at normal temperature, i. e., room temperature, and it will take place at temperatures as low as −80° C. Uranium fluoride is not reducible by the process of this invention.

The alkali metal aluminum hydride incorporated in the ether solution of uranium tetrahalide may be incorporated as such or may be formed in situ. In the latter case, an aluminum halide is added to, or dissolved in, the ether solution of uranium tetrahalide, and the resultant solution is contacted with alkali metal hydride. In time, reaction occurs between the alkali metal hydride and the aluminum halide whereby alkali metal aluminum hydride is formed; it is soluble in the ether. Reaction then takes place between the uranium tetrahalide and the alkali metal aluminum hydride whereby uranium tetrahalide is reduced.

The aluminum halide is selected from the group consisting of aluminum chloride, aluminum bromide, and aluminum iodide. Aluminum fluoride is unsuitable for this purpose. The amount of aluminum halide used can be, and preferably is, substantially less than the stoichiometric amount for reaction with the alkali metal hydride. The aluminum halide need be present only in small amounts to form an initial amount of the alkali metal aluminum hydride. The quantity is preferably only 5 to 25% of the stoichiometric amount necessary for reaction with all of the alkali metal hydride. During the rest of the reduction reaction, the alkali metal aluminum hydride is regenerated by the excess alkali metal hydride, i. e., the excess of alkali metal hydride with respect to that amount necessary to convert the aluminum halide to the initial alkali metal aluminum hydride. Examples of suitable alkali metal aluminum hydride are lithium aluminum hydride and sodium aluminum hydride.

The ether used in the process of this invention is an ether in which the uranium tetrahalide is soluble. Suitable ethers include the aliphatic ethers, such as diethyl ether, and the cyclic ethers, such as tetrahydrofuran and tetrahydropyran. The ether is used in substantially anhydrous form when it is desired to form uranium trihalide as a product of the reduction of uranium tetrahalide. It has been found that tetrahydrofuran is an excellent solvent for uranium tetrahalides, especially uranium tetrachloride. Furthermore, the cyclic ethers are excellent solvents for alkali metal aluminum hydrides. Lithium aluminum hydride is soluble in diethyl ether so that in the preparation of lithium aluminum hydride by reaction of lithium hydride with a diethyl ether solution of an aluminum halide ($AlCl_3$, $AlBr_3$, and $AlI_3$) an excess of lithium hydride can be used. The resultant solution of lithium aluminum hydride in diethyl ether is separated from the insoluble excess lithium hydride. Since tetrahydrofuran is a better solvent than diethyl ether for lithium aluminum hydride, it is the preferred solvent.

It was found that sodium aluminum hydride can be prepared by contacting a tetrahydrofuran solution of aluminum halide with sodium hydride and separating the insoluble excess sodium hydride from the resultant solution of sodium aluminum hydride in tetrahydrofuran.

The following examples illustrate the process of this invention; but these examples are by way of illustration and are not intended to limit the invention thereto.

*Example I*

Diethyl ether solutions of uranium tetrachloride (2.64 millimoles) and lithium aluminum hydride (2.64 millimoles) were mixed at a temperature of −80° C. The total volume of diethyl ether solvent was 20 ml. The reaction occurred during several hours of stirring of the mixture as indicated by the precipitation of a black powder. The powder was separated from diethyl ether by filtration and was washed several times with fresh diethyl ether in an inert atmosphere because the powder was pyrophoric. The powder was found to be 80% uranium trichloride.

*Example II*

A similar experiment was carried out by stirring a mixture of tetrahydrofuran solutions of uranium tetrachloride (2.64 millimoles) and lithium aluminum hydride (2.64 millimoles). The total volume of tetrahydrofuran was 25 ml. A black pyrophoric powder was obtained. The powder was washed with diethyl ether after separation from the initial tetrahydrofuran solution.

*Example III*

A solution in tetrahydrofuran (50 ml.) of 6.6 millimoles of $UCl_4$ and 0.7 millimole of $AlCl_3$ was placed in a glass vessel and a water-cooled reflux condenser was connected to the top thereof. The condenser was provided with means for maintaining a nitrogen atmosphere within the condenser and the glass vessel. Dry lithium hydride was introduced into the glass vessel, and the mixture was stirred with heating for seven hours. After an induction period, the stirred mixture suddenly turned dark, and a precipitate formed. The precipitate was filtered and washed with diethyl ether. The resultant black powder was found to contain $UCl_3$ and $LiCl$.

*Example IV*

One and three-tenths grams (0.01 mole) of aluminum trichloride was mixed with a fourfold excess of sodium hydride (1 g.) in a nitrogen atmosphere. Nitrogen was evacuated from the system and 15 ml. of tetrahydrofuran was condensed by passing tetrahydrofuran vapor into the vessel containing the mixture and cooling the vessel in liquid nitrogen. The liquid nitrogen cooling bath was removed, and the mixture of sodium hydride, aluminum chloride, and tetrahydrofuran was allowed to warm up to room temperature. A vigorous reaction occurred; the mixture resulting therefrom was filtered. The filtrate was a solution of sodium aluminum hydride in tetrahydrofuran. This solution was mixed with a tetrahydrofuran solution of uranium tetrachloride whereupon a black precipitate is formed from the resultant mixture.

By a suitable choice of reaction conditions, including the use of a large excess of reducing agent, further reduction of the valence of the uranium is possible.

What is claimed is:

1. A process for reducing a uranium tetrahalide of the group consisting of chloride, bromide, and iodide, which comprises incorporating an alkali metal aluminum hydride in an ether solution of said uranium tetrahalide to form uranium trihalide.

2. The process of claim 1 wherein the uranium tetrahalide is uranium tetrachloride, the ether is diethyl ether, and the alkali metal aluminum hydride is lithium aluminum hydride.

3. The process of claim 1 wherein the uranium tetrahalide is uranium tetrachloride, the ether is tetrahydrofuran, and the alkali metal aluminum hydride is lithium aluminum hydride.

4. The process of claim 1 wherein the uranium tetrahalide is uranium tetrachloride, the ether is tetrahydrofuran, and the alkali metal aluminum hydride is sodium aluminum hydride.

5. A process for reducing a uranium tetrahalide of the group consisting of chloride, bromide and iodide, which comprises contacting an ether solution of said uranium tetrahalide and an aluminum halide of the group consisting of chloride, bromide, and iodide with an alkali metal hydride whereby an alkali metal aluminum hydride forms and reacts with said uranium tetrahalide to form uranium trihalide in said ether.

6. A process for reducing uranium tetrachloride, which comprises contacting an ether solution of uranium tetrachloride and aluminum chloride with an alkali metal hydride whereby an alkali metal aluminum hydride forms and reacts with said uranium tetrachloride to form uranium trichloride in said ether solution.

7. A process for reducing uranium tetrachloride, which comprises contacting an ether solution of said uranium tetrachloride and aluminum chloride with an alkali metal hydride whereby an alkali metal aluminum hydride forms and reacts with said uranium tetrachloride in said ether solution to form uranium trichloride, said aluminum chloride being present in substantially less than stoichiometric amount.

8. The process of claim 7 wherein the alkali metal hydride is lithium hydride and the ether is diethyl ether.

9. The process of claim 7 wherein the alkali metal hydride is lithium hydride and the ether is tetrahydrofuran.

10. The process of claim 7 wherein the alkali metal hydride is sodium hydride and the ether is tetrahydrofuran.

References Cited in the file of this patent

Friend: "Textbook of Inorganic Chemistry," vol. 7, part 3, page 293 (1926). Pub. by Charles Griffin & Co., London.